April 28, 1959  J. C. GEBHART ET AL  2,884,234
GREASE KETTLE
Filed Nov. 14, 1955  2 Sheets-Sheet 1

INVENTORS
LESLIE U. FRANKLIN
JULIUS C. GEBHART
BY

THEIR ATTORNEY

April 28, 1959 J. C. GEBHART ET AL 2,884,234
GREASE KETTLE

Filed Nov. 14, 1955 2 Sheets-Sheet 2

INVENTORS
LESLIE U. FRANKLIN
JULIUS C. GEBHART
BY

THEIR ATTORNEY

United States Patent Office
2,884,234
Patented Apr. 28, 1959

2,884,234

GREASE KETTLE

Julius C. Gebhart and Leslie U. Franklin, Port Arthur, Tex., assignors to Gulf Oil Corporation, Pittsburgh, Pa., a corporation of Pennsylvania Application November 14, 1955, Serial No. 546,669

8 Claims. (Cl. 259—107)

The present invention relates to the manufacture of lubricating greases, and more particularly comprises an improved kettle for use in manufacturing lubricating greases. The apparatus provides means for thoroughly mixing and blending the ingredients, as well as for scraping adherent material from the interior of all heated surfaces of the kettle.

Modern lubricating greases usually contain soaps and lubricating oils as the principal constituents, which are worked into a more or less uniform blend of intermingled colloidal particles. In addition various modifying constituents are often included for special purposes. The soaps and oils employed as grease components are often not readily miscible at ordinary temperatures, but miscibility improves at higher temperatures and blending is therefore usually effected at such temperatures.

In the manufacture of all types of lubricating greases the physical structure or consistency of the grease and its stability with respect to oil separation upon aging depend substantially on the technique of manufacture which is usually quite as important as the ingredients used. The ingredients and particularly the lubricating oil are important from the standpoint of final lubricating properties, but the physical characteristics are also of great importance in connection with application and serviceability of the grease. It is therefore important that the ingredients be mixed and blended to a high degree of uniformity in the finished grease. Agitation must be so thorough as to be substantially a colloiding treatment and the apparatus employed must be capable of producing thorough mixing and blending.

In the design and construction of grease kettles to achieve thorough mixing, kettles having both single motion and double motion agitators have been employed. Double motion kettles have usually been preferred because in addition to the stirring and mixing action it is possible to accomplish full scraping of the interior wall of the kettle, whereas in a single motion kettle there are usually fixed baffles attached to the inside kettle wall so that scraping is only possible between the baffles. The scraping of the interior kettle wall is important in grease making because of increased heating and cooling rates which are effected by removing static insulating layers of the grease batch from the kettle wall, which in turn promotes better mixing and prevents the formation of hard lumps of "cooked" ingredients in the mix or deterioration of the materials from local overheating.

However, the principal difficulty with double motion kettles lies in the additional drive gearing necessary to operate the two counter-rotating shafts and the difficulty of maintaining a satisfactory seal between the two shafts for pressure or vacuum operation. The heat stresses and the heavy paddle loads characteristic of grease making present a difficult problem in maintaining correctly aligned shafts which are essential to the satisfactory operation of the packing gland between the two shafts of a double motion kettle.

In accordance with the present invention, we provide a single motion kettle having only one rotating shaft, which eliminates the need for a packing gland between shafts, and yet retains the adequate mixing capacity and full scraping action of a double motion design. This is accomplished by attaching baffles to a stationary center shaft and providing a rotating peripheral frame bearing scraping means to accomplish the scraping action; that is a full scraping of the kettle wall, with a set of inwardly projecting mixing paddles attached to the rotating frame to pass between the fixed center baffles.

The invention is illustrated in the drawings accompanying this specification and forming a part thereof in which like numerals refer to the same parts in the various views, and in which—

Figure 1:
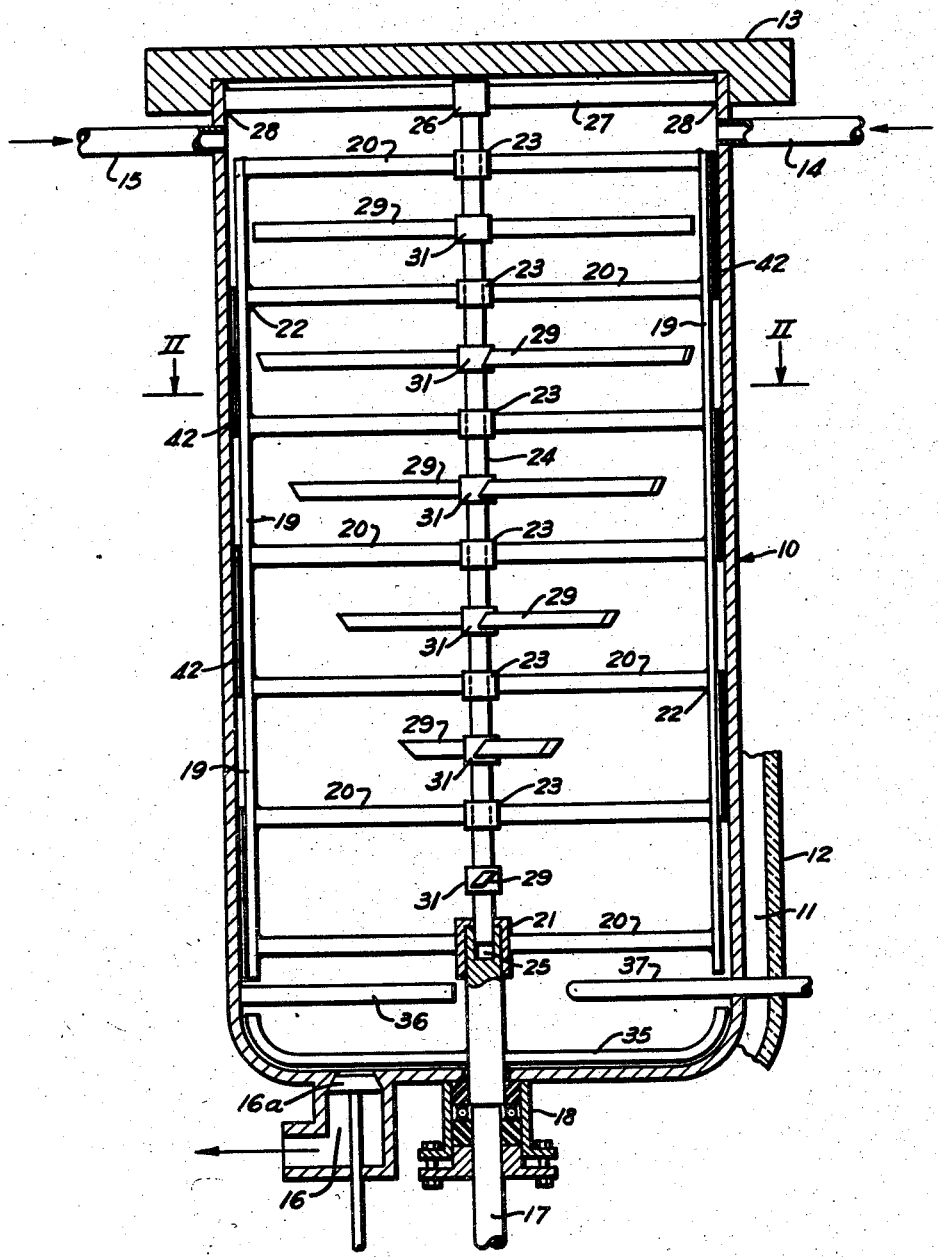
Figure 1 is a longitudinal sectional view of a grease kettle with the interior paddles and baffles shown in elevation.

Referring to the drawings, the grease kettle is designated generally by the numeral 10 and is surrounded by a suitable jacket 11 for heating or cooling the kettle and contents, the jacket 11 being surrounded by an insulating covering 12. A lid 13 is provided for kettle 10, and pipes 14 and 15 provide means for supplying grease-making ingredients to the interior of the kettle. If desired the lid 13 can be provided with a manhole, not shown, for charging solids, releasing vapors, for observation at atmospheric pressure, and the like. An outlet 16, controlled by valve 16a, is provided for withdrawing product from the kettle after mixing and blending have been completed. A drive shaft 17, journaled in a suitable bearing assembly 18, and driven by a suitable prime mover (not shown), enters the bottom of the kettle and is provided with a conventional packing gland to maintain a seal for pressure or vacuum operation. A frame 19 bearing scraping means, such as elements 38 or 42, for accomplishing scraping action on the interior wall of the kettle, and also bearing a plurality of horizontal paddles or cross arms 20 vertically displaced from each other, is welded or otherwise suitably attached to the drive shaft as at 21. Each of the paddle cross arms 20 is welded to the frame 19 at ends 22 to form a strong and rigid unitary structure. The paddle cross arms 20 are mounted intermediate their ends on bearings 23, the bearings being rotatable about stationary shaft 24. Thus, as frame 19 rotates the cross arms 20 revolve therewith as a unit about stationary shaft 24. Within and adjacent the top of kettle 10 is a cross bar 27 welded to the interior wall of the kettle as at 28. Shaft 24 is rigidly fastened to bar 27 intermediate its ends, as at 26. Thus shaft 24 is secured rigidly in place so that it cannot rotate. The lower end of shaft 24 fits in a socket bearing 25 in the upper end of drive shaft 17. Drive shaft 17 is thus in axial alignment with stationary shaft 24, and is in free rotary engagement with said stationary shaft.

Figure 2:
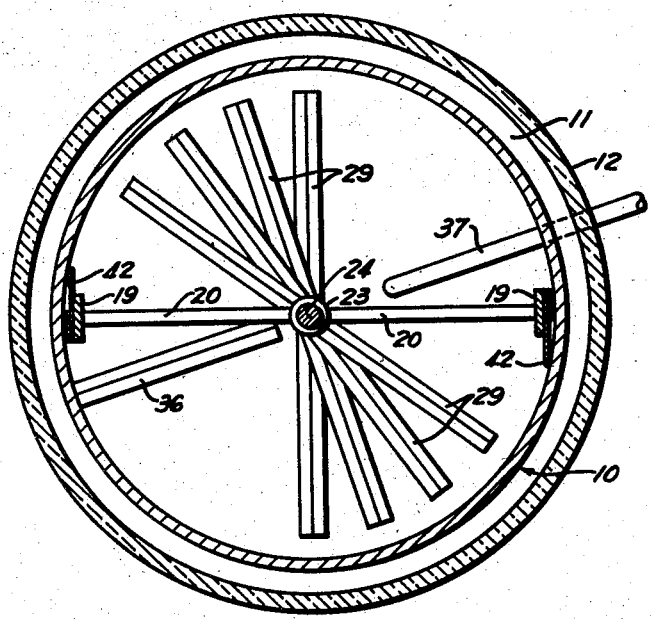
Figure 2 is a sectional view taken along the line II—II of Figure 1.

Shaft 24 is provided with a plurality of horizontal baffle members or arms 29 rigidly attached thereto, as at 31. As shown in Figure 1, the baffles are so disposed with respect to the paddle cross arms 20 of the scraping frame 19 as to provide at least one baffle member between each pair of cross arms. As shown best in Figure 2, the baffles 29 are radially arranged about the axis of shaft 24, and are preferably equiangularly displaced with respect to each other.

Attached to drive shaft 17 where it enters the bottom of kettle 10 is a curved scraper 35 for scraping the bottom of the kettle when drive shaft 17 is rotating. Between curved scraper 35 and the lowermost paddle cross arms 20 is stationary baffle 36 rigidly attached to the kettle wall. A thermocouple well 37 projects through the wall of kettle 10, preferably on the same plane as baffle 36, for measuring the temperature of the ingredients being mixed and blended in the kettle. The thermocouple well is made relatively long to avoid errors in temperature reading which may be introduced because of heat transfer from the kettle wall to the thermocouple.

Figure 3:
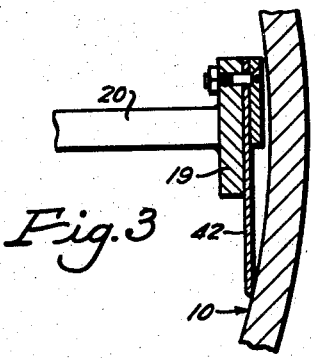
Figure 3 shows in greater detail the scraping means of Figure 2.
Figure 4:
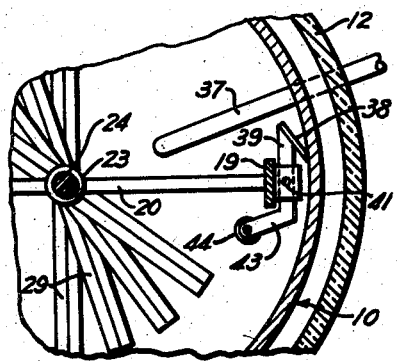
Figure 4 is a horizontal sectional view of a grease kettle in accordance with the invention showing a modified form of scraping means.
Figure 6:
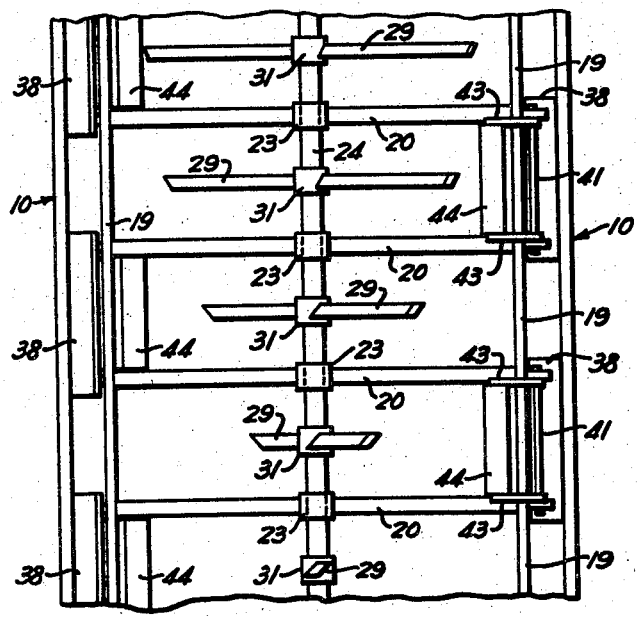
Figure 6 is a vertical sectional view of a grease kettle in accordance with the invention, showing the arrangement of the scraping means detailed in Figures 4 and 5.
Figure 5:
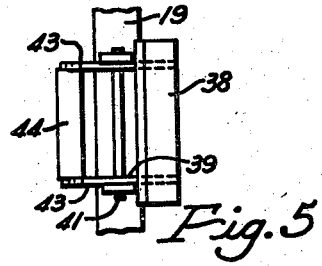
Figure 5 is a view in elevation of the modified form of scraping means of Figure 4.

As shown in Figures 3, 4 and 5 the scraping of the kettle walls is accomplished by means of a series of short scraper blades attached to frame 19 alternately on opposite sides so that the ends of the blades overlap, as shown in Figure 6, to provide complete scraping coverage of the kettle wall. Such short, discrete scraper blades, attached longitudinally to the rotating frame 19, are advantageous in that they conform most readily to any irregularities in the interior kettle wall and thus accomplish a complete and thorough scraping operation. As has been pointed out thorough scraping of the kettle wall is most important to the successful operation of a grease kettle.

A type of scraper blade which may be used in connection with the present invention is shown in Figure 3. This type of scraper comprises a flat piece of spring steel 42 attached directly on rotating frame 19. The spring steel type blades here described are relatively short, alternately mounted on opposite sides of frame 19 and of such length that the scraping action of alternate blades overlap.

A preferred type of scraping mechanism is shown in Figures 4, 5 and 6. A scraper blade 38 is mounted on a pair of arms 39 which are pivoted on a pin 41 attached to the outer periphery of the frame 19, the whole assembly being spaced between the frame and the kettle wall. Arms and blade are so arranged that blade 38 forms an acute angle with arms 39, the blade following frame 19 in its rotary movement. At the ends of arms 39 opposite to the ends at which the scraper blade 38 is attached, there are attached arms 43 at an obtuse angle to arms 39. Each pair of arms 43 bears a cylindrical weight 44. The arms 43 and weight 44 are positioned to precede frame 19 in its rotary movement. By this floating type of construction, best shown in Figure 4, upon rotation of frame 19 the cylindrical weight 44 on arms 43 is forced away from the kettle wall by the pressure of the grease batch in the kettle until scraper blade 38 at the opposite end of arms 39 is in contact with the kettle wall. So long as there is a charge in the kettle, pressure on weight 44 is maintained, which in turn retains blade 38 in close scraping engagement with the kettle wall. At the same time arms 39, pivoting on pin 41, allow the blade to move freely to conform with an out of round kettle wall, this condition being common in kettles that have been in high temperature service. Furthermore, with the scraper blade in a trailing position behind frame 19 there is less likelihood of the scraper blade jamming against the kettle wall. The large area of the blade and the angle at which the blade is inclined also tend to pull the blade toward the kettle wall when frame 19 is rotated with a grease charge in the kettle. Another advantage of this type scraper is that when frame 19 is rotated with no charge in the kettle the weighted end of the scraper mechanism (opposite to the blade end) will be forced toward the kettle wall by centrifugal force and will correspondingly pivot the scraper blade away from the kettle wall. In this type of scraper construction, as in the type shown in Figures 2 and 3, the blades are relatively short and mounted alternately on opposite sides of frame 19 so that the scraping action of alternate blades overlaps.

Stationary baffles 29 attached to shaft 24 are advantageously pitched or inclined from the horizontal to deflect material directed against them in a downward direction. Rotating paddle cross arms 20 are also advantageously pitched or inclined from the horizontal to deflect material in an upward direction. The lifting effect of the paddles 20 cooperating with the downward deflection induced by baffles 29 facilitates admixture of the ingredients, and particularly counteracts the tendency of the heavier soap elements to settle to the bottom of the kettle. The bottom scrapers 35, as well as baffle 36, also are advantageously inclined like paddles 20 so that they deflect material scraped from the kettle bottom in an upward direction.

While the exact dimensions of the grease kettle disclosed herein and its component parts are not given, it will be understood by those skilled in the art that the dimensions and relative size of the various elements may be varied to fit the requirements of particular installations without departing from the scope and spirit of the invention. For example, the paddles and baffles can be made any width desired to meet paddle load requirements and to sustain rotational speeds for mixing greases of varying viscosities. Also it will be understood that the pitch of the paddle blades and baffles, while they constitute a preferred embodiment as described, may be changed or varied in numerous ways to suit particular requirements without departing from the scope and spirit of the invention.

Furthermore while the grease kettle of the present invention has been described and illustrated as having two stationary baffles 29 for each baffle unit in the same horizontal plane, it will be apparent that such units can be provided with more than two baffles if desired. Similarly, additional scraping frame and paddle cross arm assemblies can be provided.

The invention of the present application has many advantages. First, a troublesome packing gland such as would be needed in a double motion kettle is eliminated and the drive is simplified. Second, as long as the passing speeds between the paddles and baffles of the present invention are as great as the passing speeds between the two sets of rotating paddles in a double motion kettle, mixing will be comparable for most greases to that in a double motion kettle. Third, the single revolving shaft employed permits of simplified gearing, and a single bearing and packing gland. Also a bottom drive permits removal of the top for easier access to the interior of the kettle for repairs, etc. and reduces the strain on the drive shaft because of the reduced distance between the driving gears and the lower part of the stirring mechanism which must handle the heavy concentration of soap which tends to accumulate in the lower part of the kettle. Fourth, the paddle assembly is steadied at the top of the kettle and also at intervals along the length of the stationary center shaft by the bearings 23 on which the paddle cross arms rotate. Fifth, the scrapers 35 at the bottom of the kettle are particularly advantageous for grease making purposes, because they materially assist the uniform dispersion throughout the grease batch of the heavy soap concentrates which tend to accumulate at the kettle bottom. Finally, since the baffles are mounted on the stationary center shaft instead of being attached to the kettle wall, as in conventional single motion kettles, the important advantage of obtaining full scraping of the interior wall of the kettle is readily achieved even with the single motion design.

The present invention is applicable to the manufacture of many types of greases including hard greases of high soap content and smooth consistency, such as locomotive driving journal compounds, substantially all types of cup greases, fiber greases and special greases such as universal joint lubricants, wheel bearing greases and brake cylinder compounds. The steps in the manufacturing process may vary somewhat in the case of each of these individual greases but in all cases a thorough agitation, mixing and blending to a high degree of uniformity is of great importance.

Resort may be had to such modifications and variations as fall within the spirit of the invention and the scope of the appended claims.

We claim:

1. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, a stationary shaft extending downwardly within said kettle in axial alignment with said rotatable shaft, the lower end of said stationary shaft being in free engagement with the upper end of said rotatable shaft, and a plurality of baffles mounted on said stationary shaft.

2. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, a stationary shaft extending downwardly within said kettle in axial alignment with said rotatable shaft, the lower end of said stationary shaft being in free engagement with the upper end of said rotatable shaft, a plurality of paddle cross arms integrally attached to said frame transversely thereof, said paddle cross arms being mounted intermediate their ends on bearings rotatable about said stationary shaft, and a plurality of baffles mounted on said stationary shaft.

3. The apparatus of claim 2, wherein said mixing frame is provided with scraping means substantially in scraping engagement with the interior wall of the kettle.

4. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, a stationary shaft extending downwardly within said kettle in axial alignment with said rotatable shaft, the lower end of said stationary shaft being in free engagement with the upper end of said rotatable shaft, a plurality of paddle cross arms integrally attached to said frame transversely thereof, said paddle cross arms being mounted intermediate their ends on bearings rotatable about said stationary shaft, and a plurality of baffles mounted on said stationary shaft, said baffles being so disposed with respect to said paddle cross arms as to provide at least one baffle member between each pair of paddle cross arms.

5. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, said frame being provided with scraping means substantially in scraping engagement with the interior wall of said kettle, a stationary shaft extending downwardly within said kettle in axial alignment with said rotatable shaft, the lower end of said stationary shaft being in free engagement with the upper end of said rotatable shaft, a plurality of paddle cross arms integrally attached to said frame transversely thereof, said paddle cross arms being mounted intermediate their ends on bearings rotatable about said stationary shaft, and a plurality of baffles mounted on said stationary shaft, said baffles being so disposed with respect to said paddle cross arms as to provide at least one baffle member between each pair of paddle cross arms, said baffles being radially arranged about the axis of said stationary shaft and equiangularly displaced with respect to each other.

6. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, said frame being provided with scraping means substantially in scraping engagement with the interior wall of said kettle, said scraping means comprising a plurality of scraping blades disposed alternately on opposite sides of said frame, so spaced longitudinally with respect to said kettle wall that the scraping action of each blade overlaps the scraping action of the alternate blades, each such scraper blade being mounted at the ends of arms pivotally attached to the outer periphery of said frame, said blades being attached to said arms at an acute angle with respect thereto and so disposed with respect to said frame that said blade follows said frame in its rotary movement, a weight on the ends of said arms opposite to the ends on which said blade is carried, said weight being attached to said arms at an obtuse angle.

7. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, said frame being provided with scraping means substantially in scraping engagement with the interior wall of said kettle, a stationary shaft extending downwardly within said kettle in axial alignment with said rotatable shaft, the lower end of said stationary shaft being in free engagement with the upper end of said portable shaft, a plurality of paddle cross arms integrally attached to said frame transversely thereof, said paddle cross arms being mounted intermediate their ends on bearings rotatable about said stationary shaft, and a plurality of baffles mounted on said stationary shaft, said baffles being so disposed with respect to said paddle cross arms as to provide at least one baffle member between each pair of paddle cross arms, said baffles being radially arranged about the axis of said stationary shaft and equiangularly displaced with respect to each other, said rotatable paddle cross arms being inclined from the horizontal to deflect material on which they impinge in an upward direction and said baffles being inclined from the horizontal to deflect material directed against them in a downward direction.

8. An apparatus for making lubricating greases comprising a substantially cylindrical mixing kettle, a rotatable shaft penetrating the bottom thereof and extending axially upward therethrough, a mixing frame rigidly attached to said shaft adjacent the bottom of said kettle, said frame being provided with scraping means substantially in scraping engagement with the interior wall of said kettle, a stationary shaft extending downwardly within said kettle in axial alignment with said rotatable shaft, the lower end of said stationary shaft being in free engagement with the upper end of said rotatable shaft, a plurality of paddle cross arms integrally attached to said frame transversely thereof, said paddle cross arms being mounted intermediate their ends on bearings rotatable about said stationary shaft, a plurality of baffles mounted on said stationary shaft, said baffles being so disposed with respect to said paddle cross arms as to provide at least one baffle member between each pair of paddle cross arms, said baffles being radially arranged about the axis of said stationary shaft and equiangularly displaced with respect to each other, said rotatable paddle cross arms being inclined from the horizontal to deflect material on which they impinge in an upward direction and said baffles being inclined from the horizontal to deflect material on which they impinge in an upward direction and said baffles being inclined from the horizontal to deflect material directed against them in a downward direction, and a curved scraper blade integrally attached to said rotatable shaft immediately adjacent the bottom of said kettle said curved scraper blade being substantially in scraping engagement with the bottom of said kettle and inclined from the horizontal to direct material on which it impinges in an upward direction.

References Cited in the file of this patent

UNITED STATES PATENTS

| | | |
|---|---|---|
| 526,596 | Weston | Sept. 25, 1894 |
| 785,249 | Burnham | Mar. 21, 1905 |
| 2,585,767 | Guggenheim et al. | Feb. 12, 1952 |

UNITED STATES PATENT OFFICE
CERTIFICATE OF CORRECTION

Patent No. 2,884,234                      April 28, 1959

Julius C. Gebhart et al.

It is hereby certified that error appears in the printed specification of the above numbered patent requiring correction and that the said Letters Patent should read as corrected below.

Column 6, line 32, claim 7, for "portable" read -- rotatable --; line 72, claim 8, strike out "and said baffles being inclined from"; line 73, claim 8, strike out "the horizontal to deflect material on which they impinge in"; line 74, same claim 8, strike out the words "an upward direction".

Signed and sealed this 18th day of August 1959.

(SEAL)
Attest:

KARL H. AXLINE
Attesting Officer

ROBERT C. WATSON
Commissioner of Patents